United States Patent Office 2,946,817
Patented July 26, 1960

2,946,817
RING-SUBSTITUTED DERIVATIVES OF α,α,α-2,3,4-HEXACHLOROTOLUENE

Hyman M. Molotsky, Chicago, Ill., assignor to Velsicol Chemical Corporation, Chicago, Ill., a corporation of Illinois No Drawing. Filed Jan. 8, 1957, Ser. No. 632,986

6 Claims. (Cl. 260—515)

This invention relates to new and valuable compositions of matter and to a new and useful process for the preparation of said valuable compositions. In particular, this invention relates to new halogenated derivatives of toluene containing six chlorine atoms in fixed positions and especially to a new method for the preparation of said compositions.

It is known to the art that the addition of chlorine atoms to a multitude of compounds imparts many highly desirable properties thereto, especially if the chlorine atoms are substituted in certain specific positions. Further, the addition of functional organic radicals or reactive inorganic substituents in most instances will enhance the utility of the composition, particularly if the added group is substituted in predetermined positions.

Thus, while toluene is itself a useful compound, its chlorinated, aliphatic, aryl or inorganic substituted derivatives would possess properties with a multitude of utility provided that the substituents could be readily inserted into fixed, selected positions. Unfortunately, these new substituted toluenes would be extremely difficult and quite uneconomic to prepare directly from toluene.

Unexpectantly, it has been determined that these new substituted toluenes can be prepared by a complex, novel rearrangement of a relatively stable, substituted, chlorinated bicycloheptadiene. While the exact mechanism of this unexpected and complicated rearrangement is not completely understood, it is believed to involve a shifting of the bridge carbon atom, a breaking of carbon-to-carbon bonds, a shifting of at least one chlorine atom and aromatization of the ring. It is unique that the utilization of heat alone should cause such a complicated transformation of as stable a composition as the chlorinated, bicyclic starting material, and particularly in view of the absence of any effect on the aforementioned substituent. The new process is also novel in that it converts a cycloaliphatic type composition to an aromatic composition.

Thus, one object of this invention is the preparation of new halogenated compositions of matter.

Another object of this invention is the preparation of insecticidally active compositions of matter.

Another object of this invention is the preparation of compositions of matter useful in the production of polymeric materials.

Still another object of this invention is a method of preparing aromatic compositions containing halogen atoms in fixed positions.

Other objects, features and advantages of the present invention will become apparent from the following description.

The process of the present invention comprises a rearrangement, induced by heating at elevated temperatures, of compounds of the following structure:

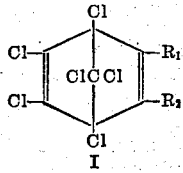

I wherein $R_1$ is independently selected from the group consisting of hydrogen, aliphatic, cycloaliphatic and aryl radicals, and $R_2$ is independently selected from the group consisting of aliphatic, cycloaliphatic and aryl radicals.

The heat activated rearrangement of the compounds with the aforementioned structure by the process of the present invention results in the formation of compounds with the following structure:

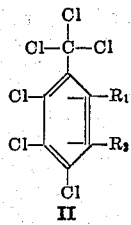

II in which $R_1$ and $R_2$ have the same identity as that of the starting material. Consequently, the rearrangement product of the process of the present invention contains 6 chlorine atoms in fixed positions and it further contains substituents which impart increased utility. It should be noted that the rearrangement product will contain the identical group or element possessed by the halogenated bicycloheptadiene starting material; that is, $R_1$ and $R_2$ of structure I are the same as $R_1$ and $R_2$ of structure II.

The products of the present invention shown above, are useful as intermediate chemicals, as insecticides, in resin production, as fungicides, as vulcanizing agents, as accelerators for the vulcanization of rubber, and as solvents. One example of the use of the products of the present invention as an intermediate is the formation of a carboxylic acid group by hydrolization of the trichloromethyl group. This is accomplished by heating the compound in a strong mineral acid such as sulfuric as in Example III hereinafter set forth. The 2,3,4-trichlorobenzoic acid produced by such hydrolysis has utility as a food preservative, fungistat, and dyestuff intermediate.

The process of the present invention comprises the heat activated rearrangement of a hexachlorobicyclo-(2.2.1)-2,5-heptadiene, as represented by structure I, to the desired hexachlorotoluene derivative of structure II. One method of preparing the aforementioned starting material is by the adduction of hexachlorocyclopentadiene with an acetylene derivative. Since the heat rearrangement process does not affect the substituent on the ring, the choice of dienophile is dependent on the desired product.

Acetylene derivatives which may be adducted with hexachlorocyclopentadiene and the product of the heat rearrangement of said adduct in accordance with the process of the present invention include:

| Acetylene Derivatives | Product of Heat Rearrangement of Hexachlorocyclopentadiene Adduct |
|---|---|
| Propargyl alcohol | hydroxymethyl-α,α,α,2,3,4-hexachlorotoluene. |
| Propargyl chloride | chloromethyl-α,α,α,2,3,4-hexachlorotoluene. |
| Propargyl bromide | bromomethyl-α,α,α,2,3,4-hexachlorotoluene. |
| 2-butyne-1,4-diol | 5,6-di(hydroxymethyl)-α,α,α,2,3,4-hexachlorotoluene. |
| 2-butyne-1,4-diamine | 5,6-di(methylamine)-α,α,α,2,3,4-hexachlorotoluene. |
| methyl acetylene | methyl-α,α,α,2,3,4-hexachlorotoluene. |
| acetylenedicarboxylic acid | 5,6-dicarboxy-α,α,α,2,3,4-hexachlorotoluene. |
| phenyl acetylene | phenyl-α,α,α,2,3,4,-hexachlorotoluene. |
| diester of acetylene-dicarboxylic acid | diester of 5,6-dicarboxy-α,α,α,2,3,4,-hexachlorotoluene. |
| 1,4-dichloro-2-butyne | 5,6-dichloromethyl-α,α,α,2,3,4,-hexachlorotoluene. |
| 2-methylbutyne-3-ol-2 | (α-methyl,α-hydroxy) ethyl-α,α,α, 2,3,4-hexachlorotoluene. |
| 3,6-dimethyl-4-octyne-3,6-diol | 5,6-di(α-hydroxy,α-methyl, propyl)-α,α,α,2,3,4-hexachlorotoluene. |
| diaminophenyl acetylene | diaminophenyl-α,α,α,2,3,4-hexachlorotoluene. |
| cyclopentylacetylene | cyclopentyl-α,α,α,2,3,4,-hexachlorotoluene. |

The above list shows only a portion of the acetylene derivatives which may be used to prepare the starting material of the process of the present invention. The starting material, a substituted hexachlorobicyclic heptadiene, may be prepared by any of the means known to the art and thus the above list is not to be construed as a limitation of the present invention but only illustrates a portion of the compositions encompassed by the present process and but one method for the preparation of the reactants utilized by said process. For example, the Diels-Alder adduct of hexachlorocyclopentadiene and an acetylenic chemical may be further reacted to form an ester, amine, amide, cyanide, thiocyanide, etc., prior to the thermal rearrangement of the present invention; or the starting material may be prepared from the corresponding bicycloheptenes or still other methods. The method of preparing the starting material is not important and does not affect the present process.

As previously indicated, the desired rearrangement occurs only at temperatures higher than room temperature, in particular at temperatures between about 190° C. and 295° C. While the preferred temperature range varies somewhat with the identity of $R_1$ and $R_2$ of structure I, it is preferred to carry out the reaction at a temperature between about 220° C. and 260° C., in which range yields in excess of 75% theoretical and up to 90% or more are obtained.

The time of reaction will vary with the temperature utilized, the substituent on the ring, and the mode of operation. It is preferred to keep the time to a minimum by operating in the preferred temperature range so as to prevent discoloration and other undesirable reactions. One valuable embodiment of the process of the present invention is to perform the heat activated rearrangement as a continuous process by passing the aforementioned starting material (structure I) continuously through a column heated to the proper temperature and continuously removing the product. By utilizing said continuous process in the proper temperature range and with adequate heat transfer surface, the rearrangement will occur almost instantaneously. The advantages of operating the process of the present invention in such a manner are numerous, such as lower production costs and uniform control of the reaction variables. While one embodiment of the process of the present invention is to operate it as a continuous process, it is not limited thereto, but can also be performed as a batch process.

The present process may be effected in the presence of solvent, but a preferred procedure is to run the reaction in the absence of solvent to facilitate recovery of the product without the necessity of fractional distillation. High boiling solvents which may be used if desired are exemplified by m-chlorotoluene, m-butyl toluene, o-ethyl toluene, silicone oils, hexachlorocyclopentadiene (used in the following examples), and the like.

Pressure does not appear to be a critical factor in the present invention and it is preferred that the reaction be run in ordinary apparatus at atmospheric pressure. If desired, the reaction may be run at pressures either above or below atmospheric pressure. Such pressures will change somewhat the reaction temperatures, time, etc. The following examples will illustrate the process and composition of matter of the present invention:

EXAMPLE I

*Adduction of hexachlorocyclopentadiene with propargyl chloride*

Hexachlorocyclopentadiene (610 g.; 2.24 moles) was placed in a round-bottomed flask equipped with a reflux condenser, stirrer and thermometer. The hexachlorocyclopentadiene was preheated to 110° C., and propargyl chloride (95 g.; 1.27 moles) was added over a four-hour period. The temperature of the reaction mixture was allowed to rise to 145° C. over a period of sixteen hours. The unreacted hexachlorocyclopentadiene was removed under reduced pressure and the crude product distilled at 122° C.–140° C. at 1.7–1.9 mm. of Hg. The pure product was distilled at 122° C. at 1.3 mm. of Hg. Its refractive index was found to be: $n_D^{20}$ 1.5665. The compound was analyzed for $C_8H_3Cl_7$:

|  | C | H | Cl |
| --- | --- | --- | --- |
| Theoretical | 27.64 | 0.87 | 71.46 |
| Found | 27.69 | 1.01 | 71.03 |

EXAMPLE II

*Rearrangement of hexachlorocyclopentadiene-propargyl chloride adduct*

Hexachlorocyclopentadiene-propargyl chloride adduct (90 g.) was added over a one-half-hour period to 220 g. of hexachlorocyclopentadiene solvent which had been preheated to 220° C. in a round-bottomed flask equipped with reflux condenser, stirrer and thermometer. The reaction mixture was maintained at 220–235° C. for a period of one hour and the hexachlorocyclopentadiene and unrearranged adduct were removed under reduced pressure. The crude product was collected at 155–158° C. at 0.8 mm. Hg and its refractive index was found to be $n_D^{20}$ 1.6183. The crude product solidified on standing and melted at 91–92.5° C. The compound was analyzed for $C_8H_3Cl_7$:

|  | C | H | Cl |
| --- | --- | --- | --- |
| Theoretical | 27.64 | 0.87 | 71.46 |
| Found | 27.90 | 0.98 | 71.45 |

The infrared spectra of the adduct and the product were different. The structure of the product is

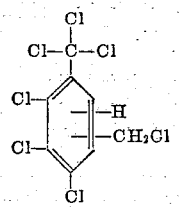

EXAMPLE III

*Hydrolyzation of rearranged adduct*

Rearranged hexachlorocyclopentadiene-propargyl chloride adduct prepared in Example II is placed in a round-bottomed flask equipped with stirrer and thermometer. To it is added 0.1 normal $H_2SO_4$. The solid product is the corresponding acid of the starting material with a structure:

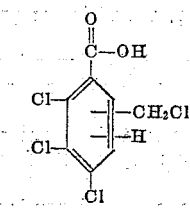

EXAMPLE IV

*Adduction of hexachlorocyclopentadiene with 1,4-dichloro-2-butyne*

Hexachlorocyclopentadiene (405 g.; 1.48 mols) was placed in a round-bottomed flask equipped with a reflux condenser, stirrer and thermometer and preheated to 170° C. 1,4-dichloro-2-butyne (121 g.; 1.0 mol) was added to the heated hexachlorocyclopentadiene, the addition time being 15 minutes. The reaction mixture was maintained at a temperature of 170–180° C. for a period of eight hours, at the end of which time the unreacted hexachlorocyclopentadiene and 1,4-dichloro-2-butyne were removed under pressure. The crude product was distilled at 155–157° C. at 1.6 mm. Hg and solidified on standing.

EXAMPLE V

*Rearrangement of hexachlorocyclopentadiene-1,4-dichloro-2-butyne adduct*

Hexachlorocyclopentadiene-1,4-dichloro-2-butyne adduct (106 g.) was heated in the presence of hexachlorocyclopentadiene (206 g.) in a round-bottomed flask equipped with reflux condenser, stirrer and thermometer for a period of two and one-half hours at 240–248° C. The solvent and unrearranged hexachlorocyclopentadiene-2,4-dichloro-2-butyne adduct were removed under reduced pressure and the crude product was distilled at 17° C. under 2 mm. Hg pressure. The refractive index of the product was $n_D^{20}$ 1.6180. The compound was analyzed for $C_9H_4Cl_8$:

|  | C | H | Cl |
|---|---|---|---|
| Theoretical | 27.31 | 1.02 | 71.66 |
| Found | 27.34 | 0.73 | 71.95 |

The structure of the product is:

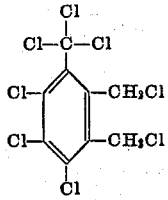

EXAMPLE VI

*Rearrangement of hexachlorocyclopentadiene-phenylacetylene adduct*

Hexachlorocyclopentadiene - phenylacetylene adduct (150 g.) was heated in a round-bottomed vessel equipped with reflux condenser, stirrer and thermometer for a period of one hour at 230–250° C. The rearranged product was recovered as the fraction distilled at 200° C. at 1.4 mm. Hg pressure. The refractive index was $n_D^{20}$ 1.6402. The compound was analyzed for $C_{13}H_6Cl_6$:

|  | C | H | Cl |
|---|---|---|---|
| Theoretical | 41.60 | 1.60 | 56.80 |
| Found | 41.65 | 1.66 | 56.75 |

The structure of the product by infrared analysis is:

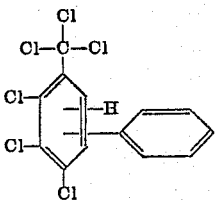

EXAMPLE VII

*Adduction of hexachlorocyclopentadiene with ethyl-propiolate*

Hexachlorocyclopentadiene (273 g.; 1.0 mol) was placed in a round-bottomed flask equipped with a reflux condenser, stirrer and thermometer and preheated to 140° C. Ethyl propiolate (76.4 g.; 0.8 mol) was added to the hexachlorocyclopentadiene. The reaction mixture was maintained at a temperature of 140–150° C. for six hours at which time the unreacted hexachlorocyclopentadiene and ethyl propiolate were removed under pressure. The product was recovered on distillation as the fraction boiling at 116.5° C. at 0.2 mm. Hg pressure and was found to have a refractive index of $n_D^{20}$ 1.5420.

EXAMPLE VIII

*Rearrangement of hexachlorocyclopentadiene-ethyl propiolate adduct*

Hexachlorocyclopentadiene-ethyl propiolate adduct (100 g.) was placed in a round-bottomed flask equipped with stirrer, reflux condenser and thermometer and containing hexachlorocyclopentadiene solvent (200 g.) and heated to 240° C. The reaction mixture was held at 240–250° C. for three hours and the hexachlorocyclopentadiene solvent and unrearranged reactant were removed under reduced pressure. On distillation, the product was recovered as the fraction with a boiling point of 197° C. at 0.5 mm. Hg pressure and a refractive index of $n_D^{20}$ 1.5814. The compound was analyzed for $C_{10}H_6Cl_6O_2$.

|  | C | H | Cl |
|---|---|---|---|
| Theoretical | 32.38 | 1.63 | 57.36 |
| Found | 32.34 | 1.73 | 57.35 |

Structure of product:

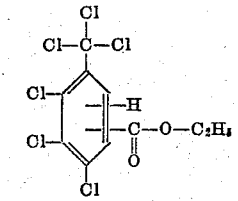

EXAMPLE IX

*Adduction of hexachlorocyclopentadiene with propargyl alcohol and esterification of adduct with acetic anhydride*

Hexachlorocyclopentadiene (273 g.; 1.0 mol) was added to a three-necked glass reaction vessel equipped with stirrer, reflux condenser and thermometer and heated to 150° C. Propargyl alcohol (45 g.; 0.8 mol) was added to the flask and the reaction mixture maintained at 150–160° C. for 7 hours, the unreacted hexachlorocyclopentadiene and propargyl alcohol removed under pressure and the desired adduct recovered as the fraction with a boiling point of 145° C. at 1.7 mm. Hg pressure. Upon distillation, it solidified into a white solid with a melting point of 86.5–87.5° C.

This adduct was then placed in a clean flask and dissolved in an excess of acetic anhydride and refluxed for four hours. The desired ester was recovered as the fraction boiling at 130–131° C. under 1.0 mm. Hg pressure, having a refractive index of $n_D^{20}$ 1.5330.

EXAMPLE X

*Rearrangement of product of Example IX*

100 grams of the ester product of Example IX was added to hexachlorocyclopentadiene solvent (200 grams) in a three-necked glass reaction vessel equipped with stirrer, thermometer and reflux condenser and the reaction mixture heated to 270° C. at which temperature it was maintained for three hours. The hexachlorocyclopentadiene solvent and unreacted starting material were removed under pressure and the desired product recovered as the fraction boiling at 154–156° C. at 0.5 mm. Hg pressure. Refractive index of product was found to be $n_D^{20}$ 1.5855 and its structure:

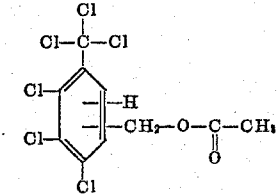

Illustrative of the insecticidal activity of the novel compositions of the present invention is the following data obtained using the compositions represented by structure II wherein $R_1$ is hydrogen and $R_2$ is phenyl. The preparation of this compound is described in Example VI.

EXAMPLE XI

For the purpose of these insecticidal tests, the test compound was formulated as a 10 percent wettable powder. It was then dispersed in water at the indicated concentrations of actual chemical and applied by dipping the host plants (cranberry bean) in the dispersion. After the treated plants had dried, the untreated insects were caged thereon.

| Concentration of Product of Example VI (Percent actual chemical) | Organism | Percent Mortality 48 Hours After Treatment |
| --- | --- | --- |
| 0.4 | Mexican Bean Beetle | 100 |
| 0.2 | do | 100 |
| 0.4 | Southern Army Worm | 90 |

EXAMPLE XII

The product of Example VI was formulated as a 10 percent by weight wettable powder, dispersed in water at a concentration of 0.4 percent actual chemical and applied to caged pea aphids by spraying at 20 pounds pressure for five seconds. The treated aphids were then caged on plants for 48 hours. The percent mortality at the end of said 48 hours was 89.6 percent of the treated aphids.

I claim:

1. A new composition of matter selected from the group consisting of hydroxy methyl-α,α,α,2,3,4-hexachlorotoluene, chloromethyl-α,α,α,2,3,4-hexachlorotoluene, bromomethyl-α,α,α,2,3,4-hexachlorotoluene, 5,6-di(hydroxymethyl)-α,α,α,2,3,4-hexachlorotoluene, 5,6-di(methylamine)-α,α,α,2,3,4-hexachlorotoluene, methyl-α,α,α,2,3,4-hexachlorotoluene, 5,6-dicarboxy-α,α,α,2,3,4-hexachlorotoluene, phenyl-α,α,α,2,3,4-hexachlorotoluene, 5,6-dichloromethyl-α,α,α,2,3,4-hexachlorotoluene, diaminophenyl-α,α,α,2,3,4-hexachlorotoluene, cyclopentyl-α,α,α,2,3,4-hexachlorotoluene, carboxyethyl-α,α,α,2,3,4-hexachlorotoluene and methyleneacetoxy-α,α,α,2,3,4-hexachlorotoluene.

2. 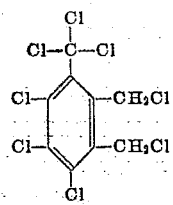

3. [structure showing Cl-C(Cl)(Cl)- attached to tetrachlorobenzene ring with two -CH$_2$NH$_2$ groups]

4. [structure showing Cl-C(Cl)(Cl)- attached to tetrachlorobenzene ring with two -COOH groups]

5. [structure showing Cl-C(Cl)(Cl)- attached to tetrachlorobenzene ring with -CH$_2$Cl and -H groups]

6. [structure showing Cl-C(Cl)(Cl)- attached to tetrachlorobenzene ring with -phenyl and -H groups]

References Cited in the file of this patent

UNITED STATES PATENTS

| | | |
| --- | --- | --- |
| 1,878,463 | Britton | Sept. 20, 1932 |
| 2,132,361 | Osswald et al. | Oct. 4, 1938 |
| 2,695,873 | Loverde | Nov. 30, 1954 |
| 2,790,786 | Moergli | Apr. 30, 1957 |
| 2,804,483 | Molotsky | Aug. 27, 1957 |